United States Patent Office 3,734,748
Patented May 22, 1973

3,734,748
METHOD OF PREVENTING THE SPOILAGE OF BREAD
Ryuzo Ueno, Nishinomiya, Tetsuya Miyazaki and Toshio Matsuda, Itami, and Shigeo Inamine and Shinichiro Arai, Nishinomiya, Japan, assignors to Ueno Fine Chemical Industries, Ltd., Osaka, Japan
No Drawing. Filed Dec. 18, 1970, Ser. No. 99,689
Int. Cl. A21d 2/14
U.S. Cl. 99—150 R    6 Claims

ABSTRACT OF THE DISCLOSURE

A method of preventing the spoilage of yeast leavened bread which consists of incorporating in the dough a mixture of an acetate and an acid compound which is crystalline at room temperature, the latter being coated with at least one coating agent of the group consisting of animal and vegetable oils and fats, monoglycerides, diglycerides, waxes and paraffin.

---

This invention relates to a method of preventing the spoilage of bread. More specifically, the invention relates to a method of making yeast leavened bread of high quality by using as the effective preservative in lieu of the conventional propionic acid preservative the exceedingly safe and harmless edible acetates and coated acid compounds, which are crystalline at room temperature. The term "acid compound," as used herein, refers to organic acids as well as the organic and inorganic acid salts.

In making bakery products, and especially the yeast leavened bread, it has been the invariable practice to use on the order of 0.2–0.4%, based on the weight of flour, of calcium propionate. One of the reasons for using this compound resided in preventing the bread product from being subjected to the dreadful consequences of the rope bacterium and another was for preventing with the use of calcium propionate the damage that would be caused to the bread by means of mold.

The damage caused by these microorganisms and the prevention thereof will be more fully described below. The rope is caused by the growth of microorganisms of the genus Bacillus which possess strong resistance to heat. This causes a total loss of the merchandise value of bread. Further, since the contamination of the plant by these *Bacillus mesentericus, Bacillus subtilis*, etc., is extremely tenacious, the contamination by these microorganisms is most feared by those engaged in the art of baking.

In the past, countermeasures such as the addition of acetic acid or acid phosphates and the introduction of an acid dough step have been adopted. That is to say, most of the methods employed were those which consisted in reducing the pH of the dough to close to that at which the growth of the genus Bacillus takes place. This method, however, had the drawback that the finished product would be adversely affected if the pH was reduced too much. Hence, this method was not fully satisfactory.

However, with the appearance of the propionates in recent years the problem of ropy bread was said to be practically solved. There still remained some drawbacks, however. That is, calcium propionate affects the normal leavening action of yeast, and in the case of the recently developed advanced continuous process having a relatively short leavening period, the effects that appear cannot be ignored. Again, if calcium propionate is added in an amount exceeding 0.2%, it gives off an odor which is objectionable.

On the other hand, let us now consider mold. Immediately subsequent to baking of bread there exists no mold at all. However, in its subsequent handling, i.e., in the removal from the pan, cooling, slicing, wrapping and transporting steps, the opportunities for contaminating bread are very numerous. Thus, when the shelf-life of bread at a retail store and the time that elapses before it is finally consumed by the consumer are considered, it must be capable of being kept for a period of at least one week before it spoils.

The case as to whether or not mycotoxins such as aflatoxin develop in the molding of bread has not been fully investigated as yet, but it must be considered a duty of the foodstuff producer to provide the consumer with bread which is not contaminated with mycotoxins. Although calcium propionate is presently being added to white bread in an amount usually of about 0.2%, based on the weight of flour used, this amount does not possess adequate preservative effects.

The reason calcium propionate is used in a concentration such as indicated is that the addition in excess of this amount results in an aggravation of the effects that are produced by the normal leavening of yeast, as well as that the flavor of the product is adversely affected. Hence, since suitable results cannot be obtained by the use of calcium propionate in its maximum useable amount, the rate of returned bread products has shown no improvement in the United States of America.

As a result of utilizing antiseptic property of acetates, we have now discovered a method of making bread having a truly surprising preservability. This method will be described hereinbelow.

The effects on microorganisms of the organic acids having an acid type antiseptic property such as acetic acid, propionic acid and sorbic acid demonstrate a great change depending upon the level of the ambient pH. This is due to the fact that the antimicrobial activity depends upon the non-dissociable molecules of the organic acid. Hence, the antimicrobial activity increases when the pH is on the acid side; the opposite being true when the pH is on the alkaline side. For example, when the acetate is added as sodium acetate alone regardless of its concentration, preservative effects cannot be expected, since the pH of the dough as well as that of the bread increases as the concentration of the sodium acetate is increased. Hence, when an organic acid, such as described, is to be used as a preservative for foods, it is most effectively and economically used when the pH is low. When considered from such a viewpoint, the method of adding acetic acid instead of an acetate becomes apparent. And, as previously noted, this method has already been tried.

However, this method has such shortcomings in that the pH of the dough as well as bread is lowered and also in that an acetic acid odor is imparted. Further, it is necessary in making bread to maintain the pH of the dough within certain ranges so as to ensure the safety of gluten and to prevent the degradation of the texture and volume of the final product. Heretofore when bread had a low pH, it also had a diminished volume due to the interference of the antibacterial activity with the fermentation process. The development of a preservative meeting the foregoing requirements was therefore investigated. As a result, it was found that it was possible to achieve very pronounced preservative effects as well as an improvement in the quality of bread by using conjointly with the acetate in making bread, a coated crystalline acid compound obtained by coating a crystalline acid compound with a substance which does not melt when cold but melts upon being heated. The coated acid compound, being isolated from the dough system, is not subjected to any change at all during the leavening of the dough, but during the baking stage after proofing of the dough the coating substance surrounding the crystalline acid compound melts and the acid substance leaks to the outside where it acts as a very effective acid in promptly and suitably reducing the pH of the bread. Thus, an effective preservative method has been established by the conjoint use concurrently with sodium acetate of a coated acid substance which does not function as an acid in its dough state but works as an effective acid in the final product.

The invention method consists of preserving yeast leavened bread by incorporating in the dough a mixture consisting of an acetate and an acid compound, which is crystalline at room temperature, said compound being coated with a coating agent such as animal or vegetable fats or oils, monoglycerides, diglycerides, waxes or paraffin, or a mixture thereof.

One of the important features of the invention method is its complete elimination of the problem of impartation of a strange odor to the product as was the case with the calcium propionate bread preservative, which was used hitherto by bakers. When the calcium propionate is added in an amount exceeding 0.2% by weight, a peculiar odor and sourness were imparted to render the bread not palatable to some consumers. This was especially the case in Japan. Hence, the maximum allowable amount of addition was on the order of 0.1%.

In the case of sodium acetate, its odor is hardly detectable up to about a 0.5% addition. And, even if detected, the odor, unlike that of propionic acid, it not unpleasant but rather presents a pleasing acidity and flavor.

Another important feature of the invention method is the decrease in the retardation of the fermentation, which was encountered without fail in the case where calcium propionate was used. In making bread using the method of this invention, an increase in the loaf volume of the product of this invention over that of the case of the control experiment demonstrates another important feature. In the case of a propionate, the proofing time must be prolonged for obtaining the usual fermentation and loaf volume, but there is no such necessity whatsoever in the case of the invention method and bread of a greater loaf volume can be still obtained.

The reasons for these advantages are as follows. Since the pH of the acetate in the dough is high, the antibacterial activity does not affect the fermentation process and hence there is no adverse effect on the yeast. Thus, it is presumed that normal fermentation takes place and along with the dissolution of the coated acid an increase in the loaf volume is brought about during the baking as a result of the factor that contributes to an increase in the volume.

The acid compounds preferably used in the invention method include the organic acids which are normally crystalline at room temperature such as, for example, fumaric acid, citric acid, malic acid, succinic acid, adipic acid and tartaric acid, or their acid salts such as, for example, monosodium fumarate, monosodium citrate, monosodium malate, monosodium succinate, monosodium adipate and sodium bitartrate. Further, as acid salts, the crystalline inorganic acid salts, for example, sodium primary phosphate, calcium primary phosphate, sodium metaphosphate and alum $[Al_2(SO_4)_3 \cdot K_2SO_4 \cdot 24H_2O]$ (pseudonym potash alum) are also desirable.

According to the invention method, the acetate is preferably used in an amount of 0.2–0.5% by weight relative to the wheat flour used in the bread mix. When the amount is less than 0.2% by weight, no preservative effects are accomplished. On the other hand, when the amount exceeds 0.5% by weight, the fermentation of the yeast is hindered and the quality of the bread deteriorates. Further, at concentrations greater than that indicated, the bread making property of the wheat flour gluten is impaired and results in a bread with poor texture. The organic acid to be conjointly used with the acetate must be used in an amount of at least 0.03% by weight relative to the wheat flour of the bread mix. When the amount is less than 0.03% by weight, no preservative effects are demonstrated. On the other hand, the acid salt of an organic acid to be conjointly used with the acetate must be used in an amount of at least 0.06% by weight relative to the aforesaid wheat flour. No preservative effects are demonstrated when the amount is less than 0.06% by weight. In the case of the acid salt of an inorganic acid to be conjointly used with the acetate, the amount used must be at least 0.045% by weight based on the aforesaid wheat flour. No preservative effects are had when the amount is less than 0.045% by weight.

The amount used of the organic acid, the acid salt of an organic acid, or the acid salt of an inorganic acid becomes less as the strength of an acid of these compounds become stronger. Hence, the foregoing lower limit of the amount to be added of the organic acid, acid salt of an organic acid and acid salt of an inorganic acid is the minimum amount to be added in the case of compound which was considered to have the strongest acid action among those compounds of the respective classes. That is to say, as the organic acid, the minimum amount of 0.03% by weight of fumaric acid, as the acid salt of an organic acid, the minimum amount of 0.06% by weight of monosodium fumarate, and as the acid salt of an inorganic acid, the minimum amount of 0.45% by weight of alum were given as minimum amounts of the respective classes. In the case of calcium primary phosphate and sodium primary phosphate the minimum amounts to be added are 0.06% and 0.15% by weight, respectively.

As the coating agent, at least one substance selected from the group consisting of the animal and vegetable oils and fats, monoglycerides, diglycerides, waxes and paraffin, which has a melting point such that it does elute at room temperature but elutes during the heating steps, is used.

The coating of the acid compound is carried out, for example, in the following manner. A coating agent predominantly of a hardened oil is heat-melted and held at a temperature of 70–80° C. An organic acid or an acid salt comminuted to a particle diameter of 10 microns or less is added to the melted coating agent, after which a surfactant is also added, if necessary. This is followed by thoroughly mixing and dispersing the mixture using a homogenizer. This mixture is then sprayed into a chamber adjusted to a temperature below 40° C., using a rotating disk type spraying apparatus to thereby obtain a powdered product of a particle diameter of less than 500 microns, and preferably 50–300 microns. The coating agent must be a substance which can coat acids or acid salts and naturally must be tasteless and odorless as well as harmless from the standpoint of food hygiene. Thus, the hardened oils or mono- or diglycerides of fatty acids, waxes (Japan wax and beeswax) and paraffin are preferred. The coating agent is usually used in an amount of two to fourfold that of the acid or acid salt.

According to the invention, since the acid is in a coated state during the fermentation of the bread dough, no hindrance of the fermentation due to the acetate takes place and the fermentation proceeds normally.

Further, even though a large quantity of the coated acid is added, no change whatsoever in physical properties of the dough results, and when the acid enveloped by the coating eludes as a result of the melting of the coating during the baking of the bread, a product of low pH is obtained, thus making it possible to make bread of high preservability and having a satisfactory flavor, volume and texture resulting from the normal fermentation of the dough.

The term "acetate," as used herein, is meant to be the edible and harmless salt and includes for example, the acetates of sodium, potassium, calcium, magnesium and ammonium.

The following examples are given for further illustration of the invention. Unless otherwise noted, the parts and percentages are on a weight basis.

EXAMPLE 1 AND CONTROLS 1–5

The recipe of the mix was as shown in Table 1.

TABLE 1

|  | Sponge dough, parts | Remixed dough, parts |
|---|---|---|
| Wheat flour | 70 | 30 |
| Yeast | 2 | |
| Yeast food | 0.1 | |
| Common salt | | 1.8 |
| Sugar | | 4 |
| Shortening | | 4 |
| Water | 40 | 20 |

First, after kneading the sponge dough for 2 minutes at a low speed, it was fermented at 28° C. for 4 hours. The remixing operation was then carried out for 6 minutes, at which time the seasonings as well as the preservatives were added. After a second fermentation lasting for 30 minutes, the dough was divided into portions each 150 grams in size and a benching time of 15 minutes was allowed. Each of the portioned dough was placed in a mould and proofed for 40 minutes at 37° C. in a rotary proofing oven. Next, the baking was carried out for 20 minutes at 230° C. in a rotary oven. Six loaves of the product were withdrawn. Of these, three loaves were used and following tests were carried out: a volume measurement after a lapse of one hour, and a sensorial test, measurement of pH and measurement of the crumb hardness by means of a bakers compressimeter after a lapse of 12 hours. Five slices from each of the three remaining loaves, i.e. a total of 15 slices, were obtained and each of these slices of bread was placed in a polyethylene bag and sealed. These bags containing the sliced bread were stored in a constant temperature chamber of 30° C. and observations were made of spoilage due to mold, etc., that result with the passage of time.

Table 2 shows the effects on the quality of the product when experiments were carried out when the additives indicated were used as preservatives.

When sodium acetate and the coated fumaric acid were conjointly used, the pH of the dough did not drop, but a considerable drop took place in the pH of the product bread. While the volume of the bread became small in the experiments in which propionic acid and acetic acid were used, an opposite tendency was noted in the case of the experiment in which sodium acetate was added. As to the hardness of the crumbs, it was seen that the hardness was especially great in the case where acetic acid was added, the pH of which was low from the dough stage. On the other hand, the results of the sensorial test showed that when calcium propionate was added in an amount of 0.2%, a peculiar propionic acid odor was given off by the bread, which moreover had an unpleasant sour taste. Now, when only acetic acid was added, a peculiar acetic acid odor was evolved, which was attended by a strong acidity. However, in the case where sodium acetate was added, practically no odor was sensed. Moreover, when the coated fumaric acid was added to the sodium acetate, an acid odor could not be detected, and the product bread also had a good flavor. When sodium acetate was conjointly used with other acids, such as lactic acid, the volume was not increased because of the reduced pH from the outset.

Further, as regards the preservative effects, it is apparent from the results shown in Table 3, that adequate effects are demonstrated by the conjoint use of sodium acetate and the coated fumaric acid.

The product obtained by the conjoint use of sodium acetate and the coated fumaric acid also yielded results in the test which compare favorably with the product obtained in Control 1 (wherein a preservative was not added). Thus, it was possible to obtain comparable preservative effects without being troubled at all by the odor that results from the use of propionic acid and without affecting the texture and volume of the final product.

TABLE 2

| Experiment | Additive | pH Dough | pH Product | Volume of bread (ml.) | Crumb hardness (g.), 12 hrs. | Sensorial test Flavor and taste | Sensorial test Hardness |
|---|---|---|---|---|---|---|---|
| Control: | | | | | | | |
| 1 | Preservative not added | 5.62 | 5.40 | 706 | 76 | Good | Normal. |
| 2 | Calcium propionate 0.2% | 5.62 | 5.42 | 690 | 75 | Acid odor, sour | Do. |
| 3 | Acetic acid 0.3% | 5.48 | 5.32 | 688 | 84 | Strong acid odor | Hard. |
| 4 | Sodium acetate 0.4% | 5.70 | 5.40 | 726 | 76 | Good | Normal. |
| 5 | Sodium acetate 0.4% plus 50% lactic acid 0.2%. | 5.40 | 5.28 | 700 | 78 | do | Slightly hard. |
| Example 1 | Sodium acetate 0.4% plus coated fumaric acid 0.2%. | 5.68 | 5.28 | 748 | 73 | do | Normal. |

TABLE 3

| Experiment | Conditions of experiment | Number of days kept 2 | 3 | 4 | 5 | 6 | 7 |
|---|---|---|---|---|---|---|---|
| Control: | | | | | | | |
| 1 | Preservative not added | [1] 10/15 | 15/15 | | | | |
| 2 | Calcium propionate 0.2% | | | | 2/15 | 8/15 | 15/15 |
| 3 | Acetic acid 0.3% | | | 4/15 | 11/15 | 15/15 | |
| 4 | Sodium acetate 0.4% | 9/15 | 15/15 | | | | |
| 5 | Sodium acetate 0.4% plus 50% lactic acid 0.2% | | | | 5/15 | 8/15 | 15/15 |
| Example 1 | Sodium acetate p.4% plus coated fumaric acid [2] 0.2% | | | | 4/15 | 9/15 | 15/15 |

[1] The numerical values in the table have the following meaning. For exapple, the figure 10/15 denotes that, of the 15 slices tested, 10 were spoiled.
[2] Composed of 33% of fumaric acid and 67% of a hardened oil.

EXAMPLE 2 AND CONTROL 6

Two kg. of wheat flour for bread making, 40 grams of yeast, 36 grams of common salt, 80 grams of sugar, 80 grams of shortening, 0.15% (based on the wheat flour) of calcium propionate and 1240 ml. of water were kneaded in slowly for 8 minutes with a mixer.

The resulting dough was divided into 150-gram portions, after which the dough portions were submitted to a first fermentation for 90 minutes at 30° C., followed by degassing, then submission to a second fermentation for 45 minutes at 30° C., followed by degassing, then benching for 15 minutes and thereafter moulding with a moulder and placing in the bread moulds. These were then held in an automatic rotary proofing chamber of 37° C. for 50 minutes and thereafter baked for 20 minutes at 30° C. in a rotary oven. Thus twenty loaves of bread were obtained each of which had a volume of about 670 ml.

Separately, twenty loaves of bread were obtained in the same manner using the same wheat flour but adding 0.3% of sodium acetate and 0.1% of coated fumaric acid (both quantities based on the wheat flour).

The former bread (Control 6), i.e. that in which calcium propionate was added and the latter (Example 2), i.e. that in which sodium acetate and the coated fumaric acid were added, were paired and submitted to a sensorial test by 15 persons. To the question as to which had a better flavor, those that favored the former numbered only two while the rest showed their preference for the latter. Hence, it was shown that the bread in which conjoint use was made of sodium acetate and coated fumaric acid was superior to that which used calcium propionate. This was followed by placing the remaining fives loaves of each of the aforesaid breads in separate polyethylene bags, which were then sealed and held in a chamber of temperature 26–32° C. with the following results. On the sixth day, one loaf of the bread in which calcium propionate was used and two loaves in which sodium acetate and coated fumaric acid was used became moldy, while on the seventh day one loaf in each of the two classes of breads became moldy and on the eighth day all of the loaves, i.e. five loaves of both classes became spoiled. Hence, this test demonstrated that there was practically no difference in preservative effects between the two types of bread additives.

EXAMPLES 3–6 AND CONTROLS 7–14

Four hundred grams of wheat flour, 16 grams of shortening, 8 grams of yeast, 7.2 grams of common salt, 16 grams of sugar, 0.8 gram of a fermentation accelerator and 248 ml. of water were used and, after mixing for 8 minutes, the resulting dough was divided into three 150-gram portions. After a first fermentation (30° C., 15 minutes) and a benching (30° C., 15 minutes) followed by moulding with a National moulder, the dough was placed in bread moulds and proofed for 50 minutes at 37° C. and a humidity of 96%. This was followed by baking the dough in a rotary oven for 16 minutes at 230° C. The preservative was added at the time the dough was mixed. Three loaves of bread were obtained from each experiment. Seventeen hours later, two slices of bread were taken from each loaf, making a total of six slices. These were sealed in polyethylene bags and kept in a 30° C. constant temperature chamber. Twice daily the bagged bread was observed for the appearance of mold. The slice of bread was determined to have been spoiled upon the appearance of even a single moldy spot.

As a result of the preservation test, results shown in Table 4 were obtained. When a variance analysis of the results given in the foregoing table was carried out with respect to preservative activity, the level of significance as regards the amount added of the two chemicals was of 1% significance. Thus, it is seen that, while sodium acetate alone has no effect whatsoever even if it is added up to 0.45%, its preservative activity demonstrates an abrupt increase starting from an addition of 0.3% when the conjoint use is made of coated fumaric acid in an amount of 0.1–0.2% (since the fumaric acid is coated with a twofold amount of a hardened oil, the amount of fumaric acid equals 0.03–0.06%). Further, not much can be expected as far as the enhancement of the effectiveness of sodium acetate is concerned by adding it in an amount exceeding 0.3%, i.e. by increasing its concentration.

TABLE 4

| Amount added of coated fumaric acid [1] (percent) | Amount added of sodium acetate (percent) | | | |
|---|---|---|---|---|
| | 0 | 0.15 | 0.3 | 0.45 |
| 0 | 3.75 $a_1^2$, 3.5 $a_2$, 3.75 $a_3$ } Average $b$ 3.67 | 3.5, 3.5, 3.25 } 3.42 | 3.5, 3.5, 3.5 } 3.5 | 4.0, 3.5, 3.5 } 3.67 |
| | (Control 7) | (Control 8) | (Control 9) | (Control 10) |
| 0.1 | 4.1, 3.75, 3.5 } 3.75 | 4.0, 4.0, 3.75 } 3.75 | 4.5, 5.5, 5.5 } 5.17 | 4.25, 5.0, 6.0 } 5.08 |
| | (Control 11) | (Control 12) | (Example 3) | (Example 4) |
| 0.2 | 3.5, 3.75, 4.0 } 3.75 | 3.75, 3.5, 4.0 } 3.75 | 4.5, 5.25, 5.5 } 5.08 | 4.27, 5.25, 5.0 } 5.0 |
| | (Control 13) | (Control 14) | (Example 5) | (Example 6) |

[1] The coated acid has a twofold amount relative to the acid of a coating of a hardened oil.
[2] The figures in the table indicate the number of days that the bread kept without being spoiled by mold, the $a$ value being the average of two slices, the $a_1$, $a_2$, $a_3$ being the foregoing value for each of the three loaves and the overall average being indicated as the $b$ value.

EXAMPLES 7–10 AND CONTROLS 15–17

Bread was made in accordance with the method described in Example 1, adding to the dough the acetates and fumaric acid coated with various coating agents as shown in Table 5. The pH of dough as well as the product and the condition of the product in these cases were tested as in Example 1 and the results obtained are also shown together in Table 5. Again, slices were taken from the several loaves and tested for their preservative effects as in Example 1, with the results shown in Table 6.

TABLE 5

| Experiment | Additive | pH Dough | pH Product | Condition of product Volume of bread (ml.) | Sensorial test Flavor and taste | Sensorial test Hardness |
|---|---|---|---|---|---|---|
| Control: | | | | | | |
| 15 | Preservative not added | 5.60 | 5.40 | 708 | Good | Normal. |
| 16 | Calcium propionate 0.2% | 5.62 | 5.42 | 688 | Acid odor, sour taste | Do. |
| 17 | Calcium acetate 0.4% | 5.62 | 5.42 | 720 | Good | Do. |
| Example: | | | | | | |
| 7 | Sodium acetate 0.4% plus coated fumaric acid [1] 0.15%. | 5.68 | 5.26 | 724 | ...do | Do. |
| 8 | Sodium acetate 0.4% plus coated fumaric acid [2] 0.2%. | 5.68 | 5.26 | 724 | ...do | Do. |
| 9 | Sodium acetate 0.4% plus coated fumaric acid [3] 0.2%. | 5.66 | 5.25 | 720 | ...do | Do. |
| 10 | Sodium acetate 0.4% plus coated fumaric acid [4] 0.25%. | 5.68 | 5.25 | 724 | ...do | Do. |

[1] Fumaric acid coated with a hardened oil in a ratio of 1:2.
[2] Fumaric acid coated with monostearin in a ratio of 1:3.
[3] Fumaric acid coated with a mixture of monostearin and a hardened oil in a ratio of fumaric acid=monostearin=hardened oil of 1:2:1.
[4] Fumaric acid coated with a hardened oil in a ratio of 1:4.

TABLE 6

| Experiment | Additive | Number of days kept | | | | | | |
|---|---|---|---|---|---|---|---|---|
| | | 2 | 3 | 4 | 5 | 6 | 7 | 8 |
| Control: | | | | | | | | |
| 15 | Preservative not added | 10/15 | 15/15 | | | | | |
| 16 | Calcium propionate 0.2% | | | | 2/15 | 8/15 | 10/15 | 15/15 |
| 17 | Calcium acetate 0.4% | 10/15 | 15/15 | | | | | |
| Example: | | | | | | | | |
| 7 | Sodium acetate 0.4% plus coated fumaric acid [1] 0.15% | | | 1/15 | 7/15 | 10/15 | 15/15 | |
| 8 | Sodium acetate 0.4% plus coated fumaric acid [2] 0.15% | | | 1/15 | 8/15 | 9/15 | 15/15 | |
| 9 | Sodium acetate 0.4% plus coated fumaric acid [3] 0.15% | | | | 8/15 | 10/15 | 15/15 | |
| 10 | Sodium acetate 0.4% plus coated fumaric acid [4] 0.25% | | | | 7/15 | 10/15 | 15/15 | |

[1] See footnote 1, Table 5.
[2] See footnote 2, Table 5.
[3] See footnote 3, Table 5.
[4] See footnote 4, Table 5.

It can be seen from Tables 5 and 6 that the volume, properties and preservability of the product is good when the amount of the coating agent is used such that the ratio of the coating agent to the acid is 2–4:1.

Next, the preservative effects of the bread obtained in the foregoing experiment were tested as in Example 1 with the results shown in Table 8.

TABLE 8

| Experiment | Additive | Number of days kept | | | | | | |
|---|---|---|---|---|---|---|---|---|
| | | 2 | 3 | 4 | 5 | 6 | 7 | 8 |
| Control: | | | | | | | | |
| 18 | Preservative not added | 12/15 | 15/15 | | | | | |
| 19 | Calcium propionate 0.2% | | | | | 5/15 | 11/15 | 15/15 |
| Example: | | | | | | | | |
| 11 | Sodium acetate 0.4% plus coated citric acid 0.2% | | | | | 7/15 | 13/15 | 15/15 |
| 12 | Sodium acetate 0.4% plus coated malic acid 0.17% | | | | | 4/15 | 12/15 | 15/15 |
| 13 | Sodium acetate 0.4% plus coated succinic acid 0.15% | | | | | 4/15 | 13/15 | 15/15 |
| 14 | Sodium acetate 0.4% plus coated tartaric acid 0.2% | | | | | 3/15 | 10/15 | 15/15 |
| 15 | Sodium acetate 0.4% plus cozted calcium primary phosphate 0.18% | | | | | 5/15 | 10/15 | 15/15 |
| 16 | Sodium acetate 0.4% plus coated adipic acid 0.19% | | | | | 5/15 | 10/15 | 15/15 |
| 17 | Sodium acetate 0.4% plus coated sodium metaphosphate 0.45% | | | | | 5/15 | 9/15 | 15/15 |
| 18 | Sodium acetate 0.4% plus coated alum 0.13% | | | | | 4/15 | 11/15 | 15/15 |

NOTE: The acids or acid salts were coated in all cases with a twofold amount of a hardened oil. The amount added of the acids or acid salts were in all cases such that their pH reducing capacity corresponded to that of 0.05% of fumaric acid.

EXAMPLES 11–17 AND CONTROLS 18 AND 19

Bread was made as in Example 1, adding to the dough at the same time with the addition of 0.4% of sodium acetate, either a hardened oil coated solid organic acid or an acid phosphate in an equimolar amount in terms of the acid (0.03% calculated as fumaric acid). The effects that were had on the product are shown Table 7.

EXAMPLES 19–20 AND CONTROLS 20–22

Bread was made as in Example 1, adding at the same time with 0.4% of sodium acetate a solid acid salt of an organic acid coated with a hardened oil. The effects had on the quality of the bread were as shown in Table 9.

TABLE 9

| Experiment | Additive | pH | | Volume of bread (ml) | Sensorial test | |
|---|---|---|---|---|---|---|
| | | Dough | Product | | Flavor and taste | Hardness |
| Control: | | | | | | |
| 20 | Preservative not added | 5.60 | 5.40 | 708 | Good | Normal. |
| 21 | Calcium propionate 0.2% | 5.62 | 5.42 | 686 | Acid odor, sour taste | Do. |
| 22 | Sodium acetate 0.4% | 5.68 | 5.42 | 718 | Good | Do. |
| Example: | | | | | | |
| 19 | Sodium acetate 0.4% plus coated sodium bi-tartrate 0.4%. | 5.66 | 5.26 | 720 | do | Do. |
| 20 | Sodium acetate 0.4% plus coated monosodium fumarate 0.3%. | 5.68 | 5.28 | 720 | do | Do. |

TABLE 7

| Experiment | Additive | Dough | Product | Volume of bread (ml.) | Sensorial test | |
|---|---|---|---|---|---|---|
| | | | | | Flavor and taste | Hardness |
| Control: | | | | | | |
| 18 | Preservative not added | 5.62 | 5.38 | 710 | Good | Normal. |
| 19 | Calcium propionate 0.2% | 5.64 | 5.40 | 702 | Acid odor, sour taste | Do. |
| Example: | | | | | | |
| 11 | Sodium acetate 0.4% plus coated citric acid 0.2% | 5.60 | 5.26 | 724 | Good | Do. |
| 12 | Sodium acetate 0.4% plus coated malic acid 0.17% | 5.62 | 5.28 | 728 | do | Do. |
| 13 | Sodium acetate 0.4% plus coated succinic acid 0.15% | 5.62 | 5.28 | 726 | do | Do. |
| 14 | Sodium acetate 0.4% plus coated tartaric acid 0.2% | 5.62 | 5.26 | 726 | do | Dlo. |
| 15 | Sodium acetate 0.4% plus coated calcium primary phosphate 0.18% | 5.62 | 5.26 | 724 | do | Do. |
| 16 | Sodium acetate 0.4% plus coated adipic acid 0.19% | 5.62 | 5.26 | 728 | do | Do. |
| 17 | Sodium acetate 0.4% plus coated sodium metaphosphate 0.45% | 5.60 | 5.25 | 726 | do | Do. |
| 18 | Sodium acetate 0.4% plus coated alum 0.13% | 5.60 | 5.25 | 726 | do | Do. |

Next, the preservability of the product was tested by the procedure described in Example 1 with the results shown in Table 10.

TABLE 10

| Experiment | Additive | Number of days kept | | | | | | |
|---|---|---|---|---|---|---|---|---|
| | | 2 | 3 | 4 | 5 | 6 | 7 | 8 |
| Control: | | | | | | | | |
| 20 | Preservative not added | 8/15 | 15/15 | | | | | |
| 21 | Calcium propionate 0.2% | | | | | 2/15 | 8/15 | 15/15 |
| 22 | Sodium acetate 0.4% | 9/15 | 15/15 | | | | | |
| Example: | | | | | | | | |
| 19 | Sodium acetate 0.4% plus coated sodium bitartrate 0.4% | | | | | 3/15 | 9/15 | 15/15 |
| 20 | Sodium acetate 0.4% plus coated monosodium fumarate 0.3% | | | | | 2/15 | 10/15 | 15/15 |

NOTE: The acid salts in all cases were coated with a twofold amount of a hardened oil and the contents in all cases were such that their pH reducing capacity corresponded to that of 0.05% of fumaric acid.

We claim:
1. A method for preserving bread prepared from yeast leavened dough which comprises incorporating into the dough prior to baking a mixture comprising an acetate salt in an amount of 0.2–0.5% by weight relative to the flour in the dough and an acid compound which is crystalline at room temperature in an amount of at least 0.03% by weight relative to the flour in the dough, said acid compound being in the form of particles coated with at least one coating agent selected from the group consisting of animal and vegetable oils and fats, monoglycerides, diglycerides, waxes and paraffin.
2. The method according to claim 1 wherein said acid compound is an organic acid.
3. The method according to claim 2 wherein said acetate salt is at least one compound selected from the group consisting of sodium acetate, potassium acetate, calcium acetate, magnesium acetate and ammonium acetate, and said organic acid is an acid selected from the group consisting of fumaric acid, citric acid, malic acid, succinic acid, adipic acid and tartaric acid.
4. The method according to claim 1 wherein said acid compound is an acid salt in an amount of at least 0.045% by weight relative to the flour in the dough.
5. The method according to claim 4 wherein said acetate salt is at least one compound selected from the group consisting of sodium acetate, potassium acetate, calcium acetate, magnesium acetate and ammonium acetate, and said acid salt is at least one compound selected from the group consisting of sodium bitartrate, monosodium fumarate, monosodium citrate, monosodium malate, monosodium succinate and monosodium adipate in an amount of 0.06% by weight relative to the flour in the dough.
6. The method according to claim 4 wherein said acetate salt is at least one compound selected from the group consisting of sodium acetate, potassium acetate, calcium acetate, magnesium acetate and ammonium acetate and said acid salt is at least one compound selected from the group consisting of sodium primary phosphate, calcium primary phosphate, sodium metaphosphate and alum.

References Cited
UNITED STATES PATENTS
3,510,317  5/1970  Fernholz et al. _____ 99—150

A. LOUIS MONACELL, Primary Examiner
J. R. HOFFMAN, Assistant Examiner

U.S. Cl. X.R.
99—90 P